(12) United States Patent
Maiss et al.

(10) Patent No.: US 6,513,976 B2
(45) Date of Patent: Feb. 4, 2003

(54) LINEAR GUIDE ARRANGEMENT

(75) Inventors: Harald Maiss, Schwebheim (DE); Richard Weidner, Theilheim (DE); Günter Blaurock, Niederwerrn (DE); Herbert Kirchner, Schweinfurt (DE); Holger Schmitt, Grettstadt (DE); German Dütsch, Schweinfurt (DE); Alfred Haub, Lülsfeld (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 09/970,636

(22) Filed: Oct. 4, 2001

(65) Prior Publication Data

US 2002/0067867 A1 Jun. 6, 2002

(30) Foreign Application Priority Data

Oct. 5, 2000 (DE) ......................... 100 49 348

(51) Int. Cl.⁷ .............................................. F16C 29/06
(52) U.S. Cl. ........................................ 384/15; 384/45
(58) Field of Search ............................. 384/15, 44, 45

(56) References Cited

U.S. PATENT DOCUMENTS

| | | | |
|---|---|---|---|
| 3,923,347 A | | 12/1975 | Dean |
| 4,828,402 A | | 5/1989 | Osawa ......................... 384/15 |
| 4,986,508 A | | 1/1991 | Osawa et al. ................ 248/300 |
| 5,088,839 A | | 2/1992 | Tsukada ....................... 384/45 |
| 5,297,873 A | | 3/1994 | Komiya ........................ 384/45 |
| 5,575,566 A | * | 11/1996 | Faulhaber .................... 384/45 |
| 5,622,433 A | * | 4/1997 | Suzuki et al. ................. 384/45 |
| 6,012,846 A | * | 1/2000 | Lambertz et al. ............. 384/15 |
| 6,296,413 B1 | * | 10/2001 | McCann et al. ............... 384/15 |

FOREIGN PATENT DOCUMENTS

| | | |
|---|---|---|
| DE | 3812505 | 11/1988 |
| DE | 29800700 | 7/1998 |

OTHER PUBLICATIONS

Japan Patent Abstract for JP 05 164 129, issued Jun. 29, 1993.
Japan Patent Abstract for JP 04 366 015, issued Dec. 17, 1992.
Japan Patent Abstract for 02 300 517, issued Dec. 12, 1990.
Japan Patent Abstract for JP 62 255 612, issued Nov. 7, 1987.
A copy of a brochure of STAR—Kugel—Schienenführungen Führungsschienen mit Abdeckband, pp72–75, Jan. '97.
Brochure/Manual: Technische Kunststoffe B.3.1 Berechnen von Schnappverbindungen mit Kunststoffteilen, Hoechst High Chem.; Jan. 1990.

* cited by examiner

*Primary Examiner*—Thomas R. Hannon

(57) ABSTRACT

In a linear guide arrangement (10a) with an elongated guide rail (12a) and a guide carriage (14a) that can travel thereon in the lengthwise direction (L) of the guide rail (12a), a surface of the guide rail (12a) facing the guide carriage (14a) is covered by a cover band (24a). A band securing element (32a) is placed in the vicinity of each of the two longitudinal ends (30a) of the guide rail (12a). The two band securing elements (32a) jointly secure the cover band (24a) at least with respect to its displacement in lengthwise direction (L) of the guide rail (12a), wherein each of the band securing elements (32a) at least impedes movement of the cover band (24a) relative to the guide rail (12a) directed towards the other band securing element (32a). At least one of the band securing elements (32a) can be non-positively engaged with the cover band (24a) as well as with the guide rail (12a).

48 Claims, 11 Drawing Sheets

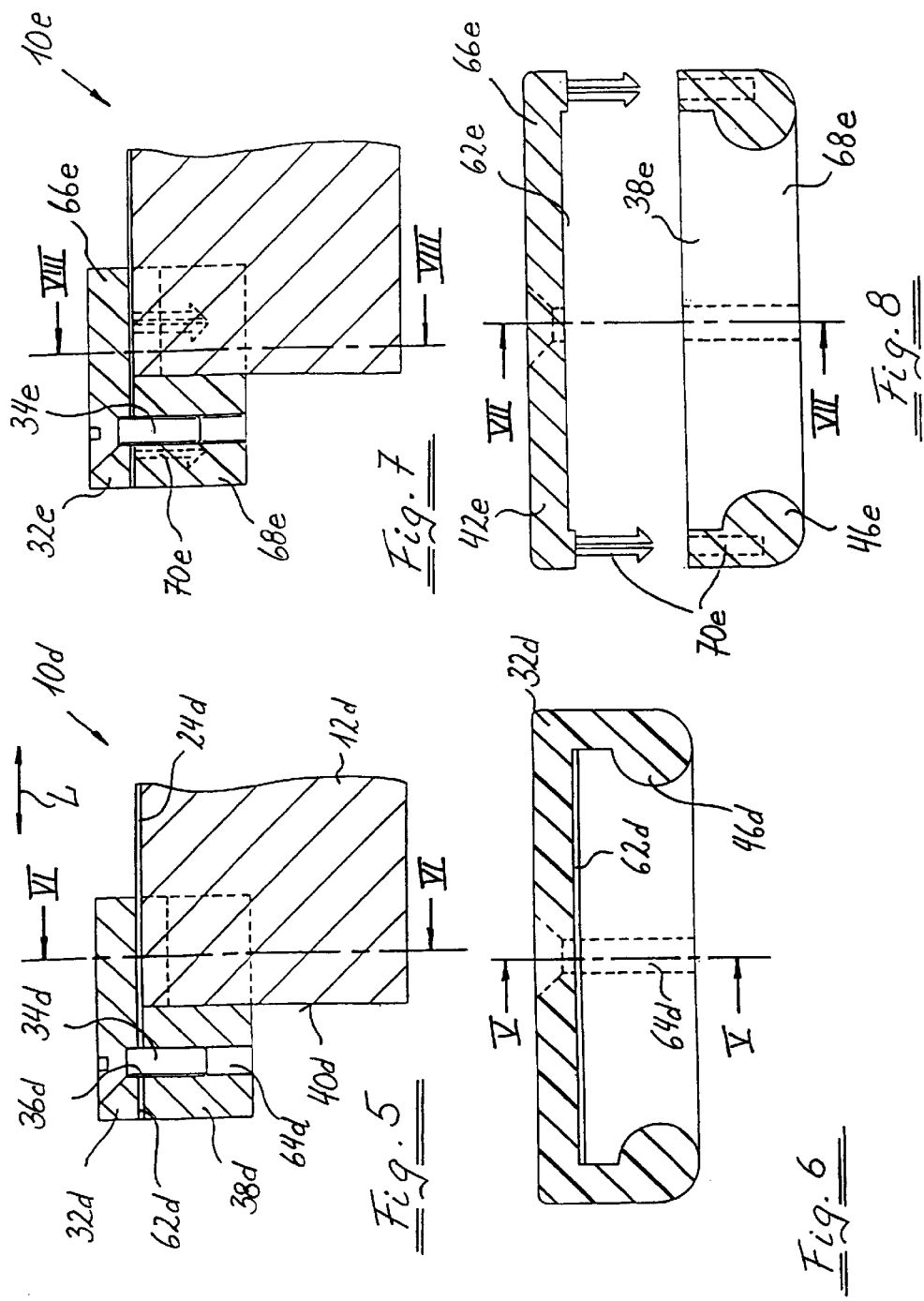

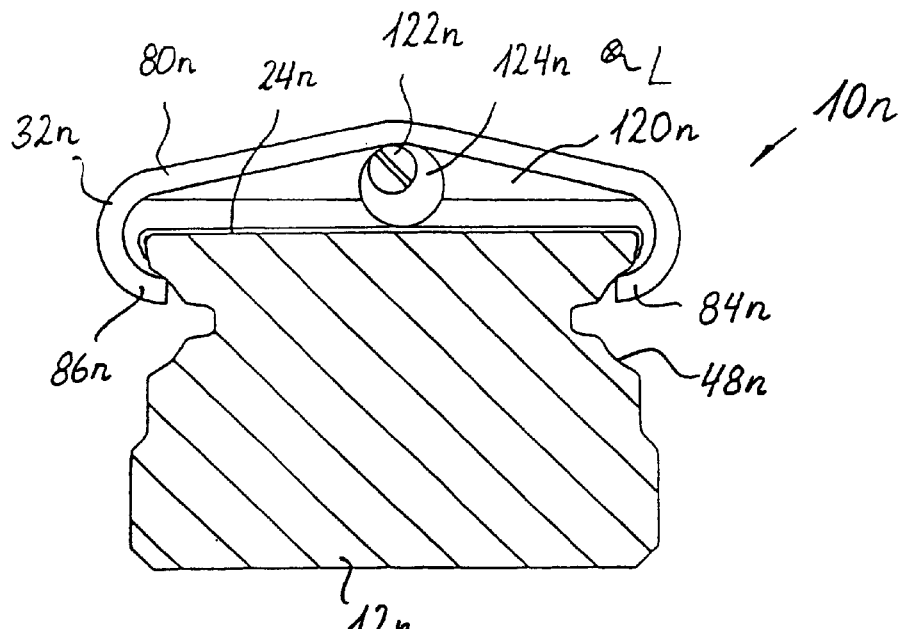
_Fig. 16_
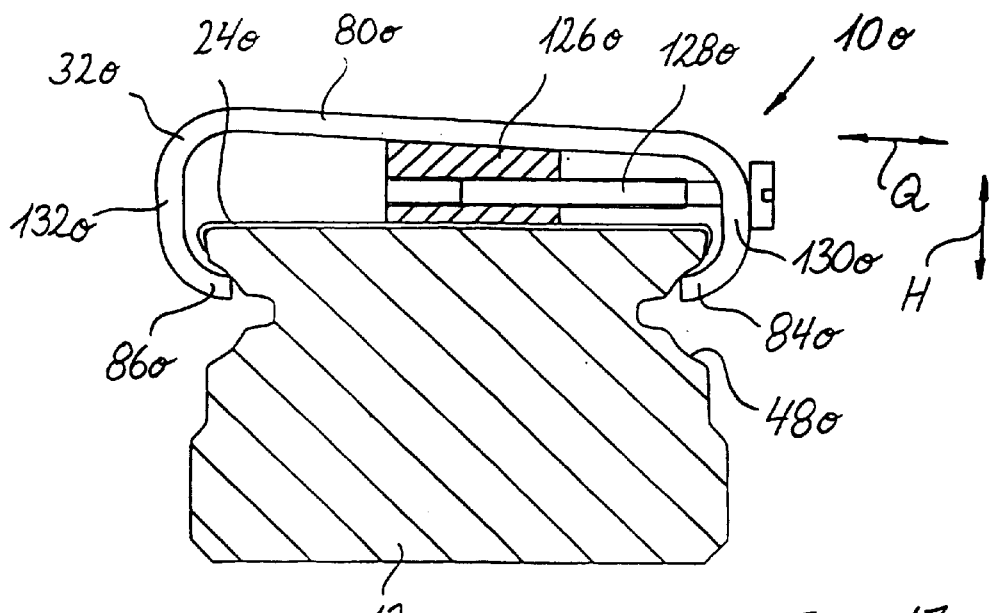
_Fig. 17_

LINEAR GUIDE ARRANGEMENT

BACKGROUND OF INVENTION

The invention relates to a linear guide arrangement with an elongated guide rail and a guide carriage that can travel thereon in lengthwise direction of the guide rail, in which a surface of the guide rail facing the guide carriage is covered by means of a cover band and in which, furthermore, a band securing element is placed in the vicinity of each of the two longitudinal ends of the guide rail.

The guide rails of such types of linear guide arrangements are normally fastened by means of screws to a main modular unit, for example, a linear guide casing or a mounting table. The fastening screws—as seen from the surface facing the guide carriage—are inserted in bore holes of the guide rail. In order to rule out the obstruction in the movement of the guide carriage as a result of these bore holes, as well as to avoid contaminating the interior space of the carriage due to dirt accumulation on the guide rail, and particularly in the fastening bore holes, the holes are covered with a cover band. In order to protect the operating personnel from injury, on the one hand, and to ensure a secure hold of the cover band on the guide rail, on the other hand, in particular to prevent an axial shifting of the cover band, i.e., a shifting in the lengthwise direction of the guide rails, band securing elements, for example in the form of covering caps, are provided on both ends of the guide rail. The caps cover the band ends and are screwed down frontally with the guide rail. Reference is made in this regard to the brochure "STAR Ball Rail Systems" of the assignee of the present application, with Identification Number "RD 82 201/07.99." The band securing elements known from DE 38 12 505 A1 are also screwed down with the guide rail.

The above-discussed screw connection of the band securing element with the guide rail raises difficulties, particularly in the so-called "miniature guide rails," whose cross-sectional area can have values of less than 10 mm×10 mm. These guide rails are normally made of a completely hardened material so that the necessary, front-end thread bore hole must be placed in the hard material. This means costly production.

But even for guide rails with larger cross-sectional area, for which only the areas of the tracks for the rolling elements of the rolling element circuits of the guide carriage are normally hardened, putting in the thread bore hole necessary for the screwed connection between the band securing elements and the guide rail is an additional processing step to be executed on the guide rail, which is quite awkward to handle because of its length.

Reference is also made to U.S. Pat. No 5,297,873, JP-A-62-255612 and JP-A-2-300517 for the state of the art. These three publications all deal with guide rails without cover band and, in particular, with stoppers, which are used to limit the track of the guide carriage on the guide rail.

SUMMARY OF THE INVENTION

In comparison with the prior art, it is the object of the invention to specify for a linear guide arrangement of the type mentioned at the start band securing elements for the cover band of the guide rail, which ensure a secure fastening of the band end to the guide rail without requiring costly processing operations on the rail. This object, previously unknown from prior art, is solved according to a first aspect of the invention through a linear guide arrangement with an elongated guide rail and a guide carriage that can travel thereon in lengthwise direction of the guide rail—wherein a surface of the guide rail facing the guide carriage is covered by means of a cover band, a band securing element is placed in the vicinity of each longitudinal end of the guide rail, which two band securing elements jointly secure the cover band to the guide rail at least with respect to its displacement in the lengthwise direction of the guide rail, and each of the band securing elements at least impedes a movement of the cover band relative to the guide rail, with such movement to be directed to the other band securing element.

While in the linear guide arrangements of the prior art, the band securing elements screwed on with the guide rail served as stoppers for the cover band, wherein each of these band securing elements prevented axial movement of the cover band beyond the longitudinal end of the guide rail, to which the respective band securing element is also fastened, an entirely different solution is now provided according to the invention. According to the invention, each of the band securing elements prevents axial movement of the cover band beyond the longitudinal end of the guide rail on which the other band securing element is arranged.

This is made possible by a positive-fitting interactive connection between the band securing element and the cover band as well as a non-positive engagement between the band securing element and the guide rail or a positive-fitting engagement of a stopping face of the band securing element with a counter stopping face of the guide rail. As a result, a screw connection between the band securing element and the guide rail can be dispensed with.

The positive-fitting interactive connection between the band securing element and the cover band may be prepared, for example, by providing at least one projection on one of the parts, i.e., the band securing element or the cover band, which engages in a corresponding recess provided on the other part, i.e., the cover band, or the band securing element.

In order to modify the previous production of the cover band as little as possible, it is suggested that the cover band, preferably roughly in its transverse center, exhibit at least a recess into which a projection of the band securing element can engage in a direction essentially orthogonal to the band plane. In such case, the cover band already conventionally used need only be subjected to a further processing step, for example, drilling, punching, or the like, in order to form the recess in it.

The projection mentioned may be integrally formed in one piece on the band securing element. It is nevertheless likewise basically possible for the projection to be made separately from a base part of the band securing element, for example, as an engaging or connecting pin.

Alternatively to the preferably centrally-located recess, the cover band may nevertheless also have at least a recess at the side, into which a projection of the band securing element engages essentially crosswise to the cover band. In both embodiments, the projection can be connected with the band securing element through a flexible web, so that it can engage in a snapping manner in the recess of the cover band to produce the interactive contact between the band securing element and the cover band. In this case, the snap connection may advantageously be designed as a detachable snap connector.

To provide the previously mentioned non-positive engagement of the band securing element and the guide rail, at least a clamping projection may be provided on the band securing element. This clamping projection may engage at the side of the guide rail, for example, preferably engaging in longitudinal grooves provided in the side faces of the guide rail in which the tracks for the rolling elements of the rolling element circuits of the guide carriage are formed. At least two such clamping projections are preferably formed on the band securing element, with the clamping projections being arranged on both sides of the guide rail. This can increase the clamping effect on the guide rail held between these clamping projections and, consequently, the hold of the band securing element on the guide rail.

To provide the previously mentioned positive-fitting engagement of the band securing element and the guide rail, which is active at least with respect to a movement of the band securing element under consideration, to be directed to the other band securing element, the band securing element under consideration may have a flange extending essentially orthogonal to the lengthwise direction of the guide rail, with the flange facing or adjacent to a frontal area of the guide rail in the installed state of the linear guide arrangement. Since the entire frontal area of the guide rail is available as a stopping face on the side of the guide rail, and also the stopping face of the flange can be formed in a corresponding size on the sides of the band securing element, the forces to be transferred are distributed over a relatively large area, which reduces the risk of damage, particularly to the band securing element, due to the accompanying pressure reduction.

The fact that space must in any event be provided for the flange on the front end of the guide rail can be used to place also the positive-fitting connection between cover band and band securing element in this area. To this end, the cover band, for example, may exhibit a length greater than the guide rail and the cover band may be connected in a positive-fitting manner with the band securing element in a section projecting over the guide rail. In particular, when using a retention pin, which engages in a positive-fitting manner in a recess of the cover band, the forces introduced by the cover band to this pin may be passed on to the band securing element over a relatively large surface, which in turn reduces the risk of damage. The retention pin may be formed from a stud, for example.

For secure guiding of the cover band, it is suggested that the band securing element be provided with a cavity, preferably a passage, into which the section of the cover band projecting over the guide rail can be introduced. The band securing element can be made of at least two parts, with one part exhibiting an upper terminating faces and the other part exhibiting a lower terminating faces of the cavity or of the passage, and preferably with the two side terminating faces of the cavity or of the passage being formed on one and the same part. The two parts at least can be secured to one another preferably through snapping connectors. A separate retention pin may be provided as another part of the band securing element. However, it is also possible to design the retention pin as one piece with one of the two parts.

To simplify its production, the band securing element may be made at least partially as a plastic or metal injection molded part.

According to an independent, second aspect of the invention, the desired securing of the cover band to the guide rail without the use of screw connections can also be achieved through a linear guide arrangement with an elongated guide rail and a guide carriage that can travel thereon in lengthwise direction of the guide rail, wherein a surface of the guide rail facing the guide carriage is covered by means of a cover band, wherein, furthermore, in the vicinity of at least one of the two longitudinal ends of the guide rail, a band securing element is placed, and wherein at least one of the band securing elements engages in a non-positive manner with the cover band as well as with the guide rail.

Through the non-positive engagement of the band securing element with the guide rail, the non-positive engagement of the band securing element with the cover band is also ensured, in the course of which a direct, non-positive engagement is simultaneously preferably brought about between the cover band and the guide rail. This can be achieved by designing the band securing element as a clamp strap element, for example. This clamp strap element may exhibit two free ends that engage at the side of the guide rail, each preferably engaging in a longitudinal groove of the guide rail. In turn, at least one track for the rolling elements of a rolling element circuit of the guide carriage can be designed in this longitudinal groove.

To produce the desired non-positive connections, the clamp strap element may press the cover band against the guide rail in a section (middle section) placed between its two free ends. It should be stressed that the term "middle section" need not necessarily mean the geometric center between the two free ends of the clamp strap element. Rather, the pressure site can also be provided in a section more to the side of the clamp strap element, provided only that these are placed between the two free ends of the clamp strap element.

The clamp strap element may have a clamp strap made up of one or several pieces, preferably manufactured from an elastic material, such as metal or synthetic material. To achieve the non-positive engagement with the cover band, the clamp strap or at least one clamp strap part in the vicinity of the middle section of the clamp strap element can be made with a bulge, preferably designed in the form of a bead.

In order to reliably ensure the desired non-positive connection, the clamp strap element may additionally include a clamping device, by means of which the pressing force of the clamp strap element against the cover band can be adjusted.

In accordance with the first variation of the embodiment, the clamping device may include a device for changing the distance or spacing between the first section of the clamp strap and the second section of the clamp strap adjacent to a free end of the clamp strap and preferably running essentially parallel hereto. The distance-changing device may be a stud, for example, which penetrates openings of the two sections of the clamp strap, whereby the opening of the section of the clamp strap away from the head of the stud is provided with an internal screw thread that has a combined effect with the screw thread on the stud shaft, while the size of the opening of the section adjacent to the head of the stud is sufficiently large that the shaft of the stud provided with the screw thread can penetrate it without any interaction therewith.

In a multi-piece construction of the clamp strap, it can be provided in a corresponding manner for the clamping device to include a device for changing the distance between a first clamp strap part and a second clamp strap part adjacent to a free end of the clamp strap, preferably running essentially parallel thereto.

The middle section of the clamp strap element may be provided on either of the clamp strap parts. If it is provided on the first clamp strap part, the second clamp strap part on a side of the first clamp strap part facing away from the cover band may support itself on this middle section. The desired non-positive engagement between the clamp strap element and the cover band may then be achieved when the second clamp strap part supports itself on the first clamp strap part in the middle section of the clamp strap element, as well as when the second clamp strap part supports itself on a section of the first clamp strap part which connects to the middle section on the side opposite the free end of the first clamp strap part.

According to a second variation of the embodiment, the clamping device may include a clamping element which forms one of the free ends of the clamp strap element. Also in this case, the clamping element may be made of a straining screw, which is threadably engaged with the clamp strap or at least one clamp strap part.

According to a first sub-variation of this second variation of the embodiment, the straining screw may have a conically shaped head and a screw axis running preferably orthogonal to the cover band plane, with the screw axis engaging with the cone surface in a longitudinal groove at the side of the guide rail. By screwing the straining screw into the clamp strap or the appropriate clamp strap part, the desired non-positive engagement of the clamp strap element and the cover band, i.e., the desired clamping effect between these two parts, is achieved.

In a second sub-variation, the straining screw may exhibit a conically shaped tip and a screw axis preferably running essentially crosswise to the cover band, the screw axis being adjacent with the cone surface to an edge of a longitudinal groove at the side of the guide rail. When the straining screw is screwed into the clamp strap or the corresponding clamp strap part, the screw axis wanders away from the cover band plane, which in turn produces or intensifies the desired non-positive engagement between the clamp strap element and the cover band.

According to a third sub-variation, the straining screw can eventually engage the guide rail at the side, wherein its screw axis runs at least partially in a direction essentially orthogonal to the cover band plane. As a result of the slanting course of the screw axis at least to the cover band plane, the desired non-positive strength between the clamp strap element and the cover band is in turn produced or intensified when the straining screw is screwed into the clamp strap or into the corresponding clamp strap part.

According to a further alternative variation of the embodiment, the clamping device may also exhibit a cam which is rotatably arranged around an axis on the clamp strap element, preferably in its middle section, and the peripheral surface of which can be pressed on the cover band.

Finally, according to a further variation of the embodiment, the clamp strap can also exhibit a greater orthogonal spacing from the cover band in the vicinity of one side edge of the cover band than in the vicinity of the other side edge, and the clamping device can include a spline that can be displaced in crosswise direction of the cover band.

In all the above-discussed embodiments, the hold at the side of the cover band relative to the guide rail can be ensured by the cover band being snapped on the guide rail with its side edges.

Finally, the non-positive engagement between the clamp strap element and the cover band can also be achieved if the clamping device, for example the straining screw, presses on the side against one of the side edges of the cover band. In this case, the straining screw in turn preferably forms one of the free ends of the clamp strap element. As a result of pressing on the side edge of the cover band, the straining screw draws the other free end of the clamp strap element into a lateral arrangement against the guide rail or, in a side engagement, into a longitudinal groove of the guide rail.

BRIEF DESCRIPTION OF THE DRAWINGS

The invention is explained more fully in the following description of the exemplary embodiments thereof, with reference to the accompanying figures, in which:

FIG. 5 is a view similar to FIG. 2 of another variation of the embodiment;

FIG. 6 is a partial sectional view of the band securing element of the embodiment according to FIG. 5, taken along the line VI—VI in FIG. 5;

FIGS. 7 and 8 are views similar to FIGS. 5 and 6 of a further embodiment of a linear guide arrangement according to the invention;

FIGS. 10 to 19 illustrate other variations of embodiments of linear guide arrangements with a clamp strap band securing element.

DETAILED DESCRIPTION OF EXEMPLARY EMBODIMENTS

Figure 1:
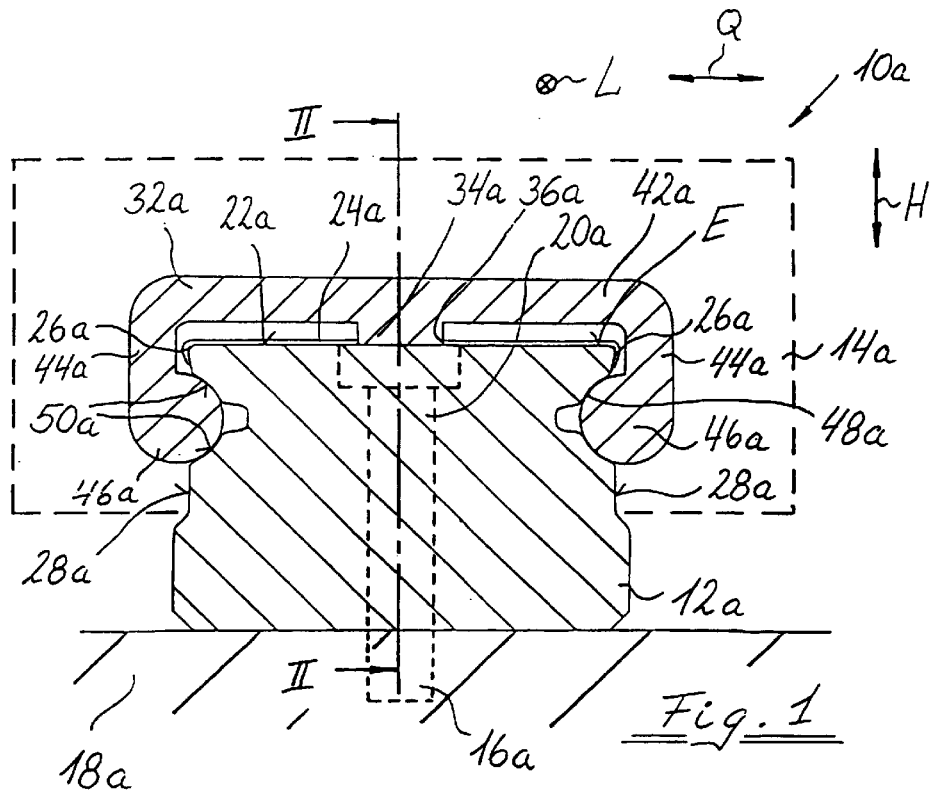
FIG. 1 is a schematic cross-sectional view orthogonal to the longitudinal axis of the guide rail of a first embodiment of a linear guide arrangement according to the invention.

In FIG. 1, a linear guide arrangement according to the invention is generally labeled 10a. It comprises a guide rail 12a that extends in the direction of a longitudinal axis L (lengthwise direction) and a guide carriage 14a positioned in a movable manner in lengthwise direction L on this guide rail, and only roughly indicated schematically by dashed lines in FIG. 1. Guide rail 12a is fastened to a higher modular unit 18a by means of studs 16a received in bore holes 18a in the guide rail 12a. So that the uniform movement of the guide carriage 14a in lengthwise direction L cannot be impaired by the studs 16a or the bore holes 20a in the guide rail 12a, the top surface 22a of the guide rail 12a is covered by a cover band 24a.

To prevent the cover band 24a from sliding relative to the guide rail 12a in the crosswise direction Q (orthogonal to the lengthwise direction L), the cover band 24a has kinked side edges 26a adjacent to the side faces 28a of the guide rail 12a. The guide rail side faces 28a adjacent to the cover band 24a are preferably slightly undercut and the side edges 26a of the cover band 24a are preferably flexibly inwardly inclined in an acute-angled manner so that the cover band 24a can be snapped onto the guide rail 12a.

In order to prevent relative movement between the cover band 24a and guide rail 12a in lengthwise direction L, a band securing element 32a is placed on both longitudinal ends 30a (see FIG. 2) of the guide rail 12a.

Figure 2:
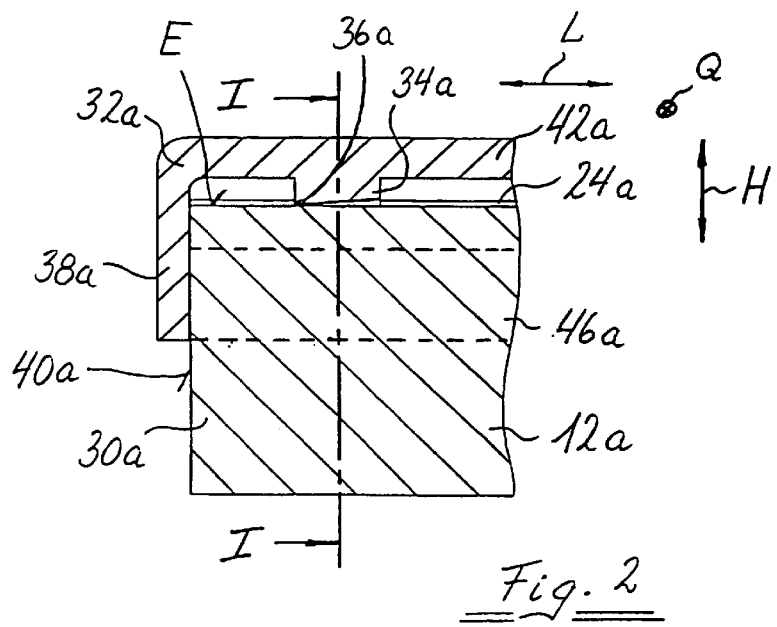
FIG. 2 is a partial sectional view of the linear guide arrangement of FIG. 1 taken along line II—II in FIG. 1.

In the exemplary embodiment shown in FIGS. 1 and 2, the band securing element 32a is in positive-fitting engagement with the cover band 24a as well as with the guide rail 12a. To this end, the band securing element 32a exhibits, on the one hand, a projection 34a which engages in an opening 36a of the cover band 24a and, on the other hand, a flange 38a which is adjacent to a frontal area 40a of the guide rail 12a. The recess 36a is provided roughly in the transverse center of the cover band 24a.

The projection 34a as well as the flange 38a are made in one piece on a base plate 42a of the band securing element 32a and, starting therefrom, extend essentially in a direction H orthogonal to the crosswise direction Q as well to the lengthwise direction L. The base plate 42a runs essentially parallel to the cover band plane E, which runs parallel to the plane extending in the lengthwise direction L and the crosswise direction Q.

If a force directed to the right in FIG. 2 acts on the cover band 24a, for example due to a movement of the guide carriage 14a on the guide rail 12a, with such force attempting to displace the cover band 24a relative to the guide rail 12a, this force is transmitted through the engagement of the projection 34a in the recess 36a of the cover band 24a to the band securing element or band securing cap 32a, and from this, through the flange 38a to the frontal area 40a of the guide rail 12a. The resulting counterforce of the guide rail 12a consequently prevents, through the band securing element 32a, a movement of the cover band 24a in FIG. 2 to the right, i.e., a movement of the cover band 24a towards the other longitudinal end of the guide rail 12a or the band securing element placed on the other end.

In a similar manner, the band securing element placed on the other longitudinal end of the guide rail 12a prevents a movement in FIG. 2 to the left of the cover band 24a relative to the guide rail 12a.

In addition to the above-described positive-locking engagement between the band securing element 32a and the guide rail 12a, the band securing element 32a is also non-positively engaged with the guide rail 12a in the embodiment shown in FIGS. 1 and 2. To this end, flanges 44a are integrally formed on the two side edges of the base plate 42a of the band securing element 32a and extend downwardly in the vertical direction H from the base plate 42a. An engaging bead 46a is formed at the free end of each flange 44a. With these beads 46a, the band securing element 32a engages in two longitudinal grooves 48a of the guide rail 12a that extend in the lengthwise direction L. In addition to this non-positive securing with respect to a movement of the band securing element 32a relative to the guide rail 12a in the lengthwise direction L, relative movement between the band securing element 32a and the guide rail 12a in the vertical direction H is prevented in a positive-fitting manner through the engagement of the beads 46a with the downwardly facing surfaces of the grooves 48a.

It should also be added that the tracks 50a for the rolling elements of the rolling element circuits (not shown) of the guide carriage 14a are formed in the longitudinal grooves 48a and form the aforementioned downwardly facing surfaces.

Figure 3:
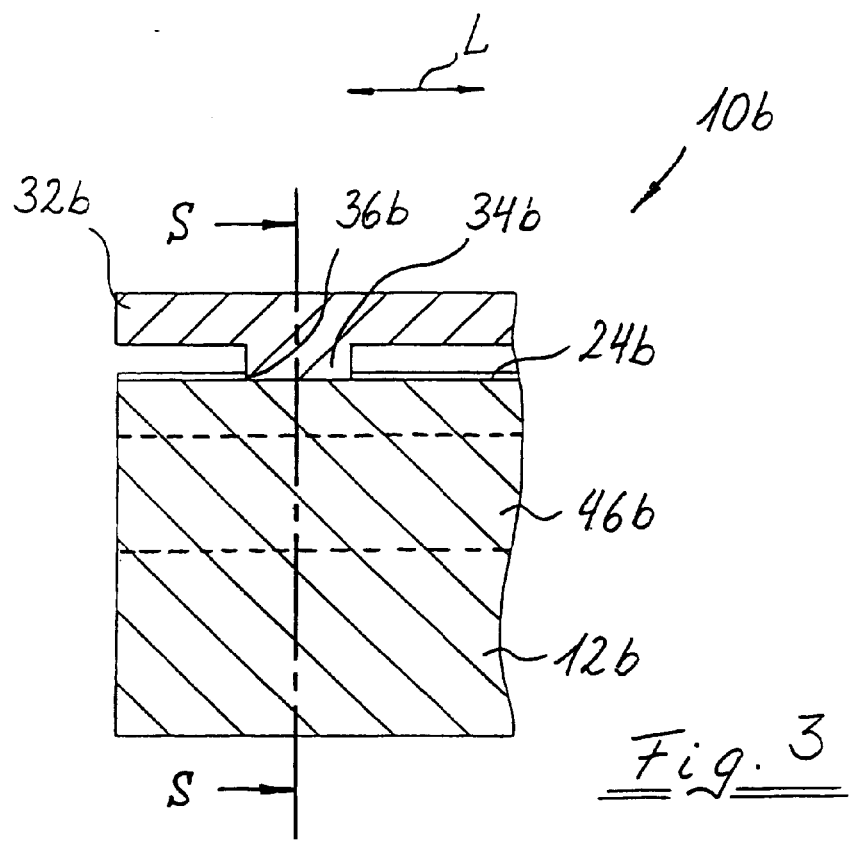
FIG. 3 is a view similar to FIG. 2 of a modified variation of the embodiment.

The embodiment of FIG. 3 essentially corresponds to the embodiment according to FIGS. 1 and 2. In FIG. 3, therefore, similar parts are provided with the same reference numbers as in FIGS. 1 and 2, but with the suffix "b" instead of "a." The embodiment according to FIG. 3 will be described in the following only insofar as it differs from the embodiment according to FIGS. 1 and 2, to whose description reference is otherwise herewith expressly made.

In the linear guide arrangement 10b shown in FIG. 3, in a view similar to FIG. 2, whose sectional view along the line S—S is identical to the illustration according to FIG. 1, the band securing element 32b is non-positively engaged with the guide rail 12b, with respect to relative movement in the lengthwise direction L, solely through the beads 46b, as it does not have a flange corresponding to the flange 38a of FIG. 2. However, the band securing element 32b is engaged positively with the cover band 24b as in the embodiment according to FIGS. 1 and 2, through a projection 34b that engages in the recess 36b of the cover band 24b.

Figure 4:
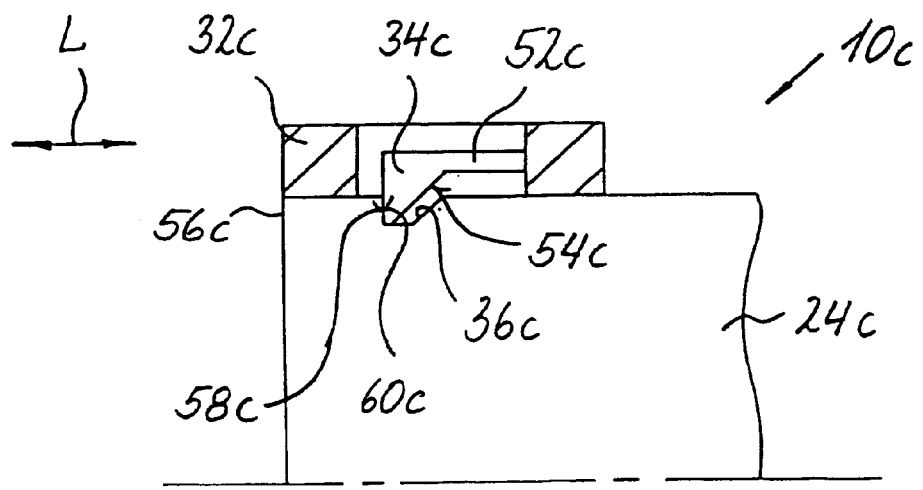
FIG. 4 is a partial sectional top view of a further variation of the embodiment.

In the embodiment of FIG. 4, which essentially corresponds to the form of embodiment according to FIGS. 1 and 2, similar parts are provided with the same reference numbers as in FIGS. 1 and 2, but with the suffix "c" instead of "a." The embodiment according to FIG. 4 will be described in the following only insofar as it differs from the form of embodiment according to FIGS. 1 to 3, to whose description reference is otherwise herewith expressly made.

With reference to the linear guide arrangement 10c according to FIG. 4, a further possibility for a positive-fitting connection of the band securing element 32c with the cover band 24c is explained. According to this embodiment, the cover band 24c exhibits recesses 36c at the side instead of a center recess, into which snap-in projections 34c of the band securing element 32c engage. The snap-in projections 34c are integrally formed in one piece on the band securing element 32c and are connected to the element 32c through flexible webs 52c.

If the cover 24c in the embodiment according to FIG. 4 is introduced in lengthwise direction L from the right into the band securing element 32, the snap-in projections 34c will be deflected due to the combined effect of a directing slope 54c on the projections 34c with the front end 56c of the cover band 24c while the webs 52c are strained elastically, until they reach the vicinity of the recesses 36c and engage in them. On the other hand, if the cover band 24c in the illustration according to FIG. 4 is pulled back to the right, a relative movement of band securing element 32c and cover band 24c is prevented by the mutual arrangement of the frontal area 58c of the engaging element 34c with the area of contact 60c of the recess 36c. These two areas 58c and 60c extend essentially orthogonal to the lengthwise direction L.

With respect to the engagement of the band securing element 32c with the guide rail, the linear guide arrangement 10c may be designed either according to the embodiment according to FIGS. 1 and 2 (positively engaged) or according to the embodiment according to FIG. 3 (non-positively engaged).

FIGS. 5 and 6 show another embodiment of a linear guide arrangement according to the invention, which essentially corresponds to the embodiment according to FIGS. 1 and 2. Similar parts are provided in FIGS. 5 and 6 with the same reference numbers as in FIGS. 1 and 2, but with the suffix "d" instead of "a." The embodiment according to FIGS. 5 and 6 will be described in the following only insofar as it differs from the form of embodiment according to FIGS. 1 to 4, to whose description reference is otherwise herewith expressly made.

In the linear guide arrangement 10d shown in FIGS. 5 and 6, the flange 38d of the band securing element 32d is thicker in the lengthwise direction L than in the embodiment according to FIG. 1 and 2. This makes it possible to displace the positive-fitting connection between the cover band 24d and the band securing element 32d in a section protruding over the frontal area 40d of the guide rail 12d. For this purpose, the band securing element 32d has a passage 62d into which the cover band 24d extends. The cover band 24d is secured in this position through a retention pin, for example, a stud 34d, which penetrates a recess 36d in the cover band 24d and is screwed into a taphole 64d in the band securing element 32d.

This embodiment facilitates a large-surface transmission of the forces exerted by the cover band 24d on the retention pin 34d to the band securing element 32d, and from there to the guide rail 12d. The accompanying reduction of the pressure per unit surface on the band securing element 32d reduces the risk of damage to the band securing element 32d.

As in the embodiment according to FIGS. 1 and 2, the band securing element 32d is further engaged non-positively with the guide rail 12d with respect to relative movement in the lengthwise direction L through clamping beads 46d.

The linear guide arrangement 10e according to FIGS. 7 and 8 differs from the linear guide arrangement 10d according to FIGS. 5 and 6 only in that the band securing element 32e is formed of several pieces not only with respect to the separate formation of the retention pin 34e. Rather, it comprises a first part 66e, which essentially forms the base plate 42e, and a second part 68e, on which the flange 38e and the clamping bead 46e are located. The two parts 66e and 68e can be secured to one another by means of snap-in connections 70e. The reason for the multi-piece manufacture lies in production simplification of the design of the passage 62e for the cover band 24e.

In this embodiment, it is furthermore conceivable to integrally form in one-piece the retention pin 34e on one of the two parts 66e, 68e.

While the band securing element 32 is positively engaged with the cover band 24 in the above-described embodiments according to FIGS. 1 to 8, embodiments in which the band securing element 32 is non-positively engaged with the cover band 24 are explained in the following. Although in the embodiments according to FIGS. 9 to 19, the band securing element 32 is also non-positively engaged with the guide rail 12, it should be noted that it is also conceivable to have embodiments in which the band securing element 32 is non-positively engaged with the cover band 24, but is positively engaged or positively and non-positively engaged with the guide rail 12.

With respect to the fastening of the guide rails 12 to the higher structural component 18 in the embodiments according to FIGS. 9 to 19, reference is made to the above description of the embodiments according to FIGS. 1 and 2.

Figure 9:
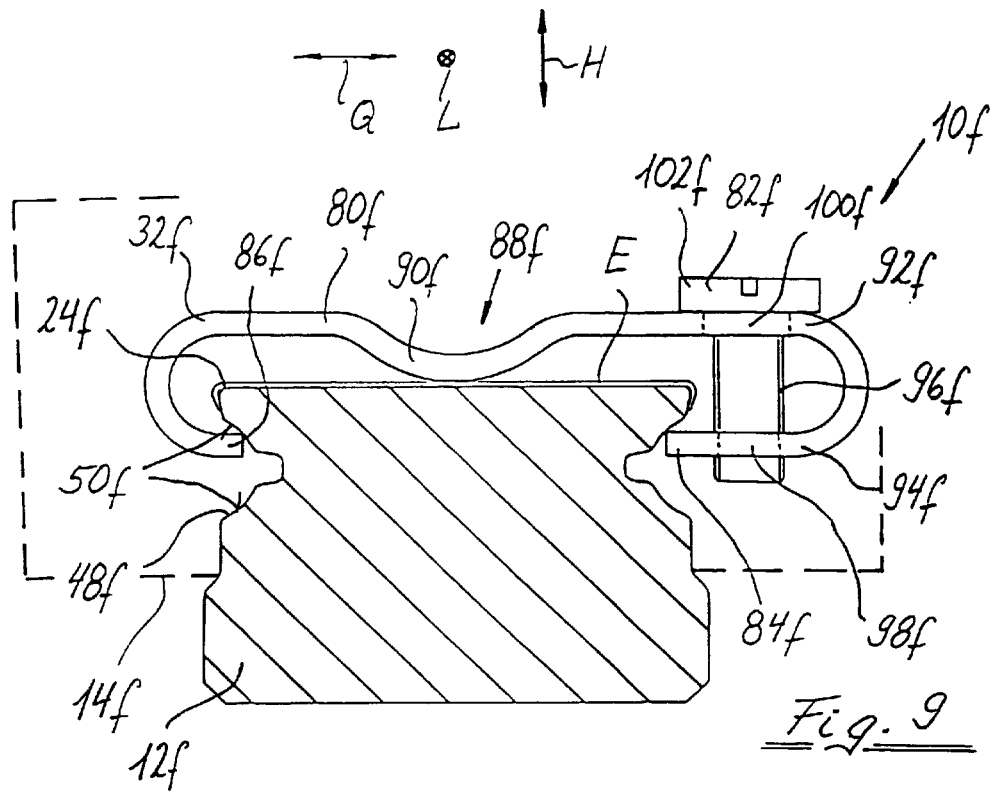
FIG. 9 is a view similar to FIG. 1 of a linear guide arrangement according to the invention, with a band securing element designed as a clamp strap element.

In the linear guide arrangement 10f according to FIG. 9, the band securing element 32f is formed from a clamp strap element that comprises a clamp strap 80f and a straining screw 82f The clamp strap 80f engages with its two free ends 84f and 86f in the longitudinal grooves 48f of the guide rail 12f, in which the tracks 50f for the rolling elements of the rolling element circuits of the guide carriage 14f are placed. In a middle section 88f located between the two free ends 84f and 86f, the clamp strap 80f is formed with a bulge 90f is formed in the form of a bead, which presses downwardly against the cover band 24f in the direction H, i.e., orthogonal to plane E of the cover band 24f extending in the lengthwise direction L and the crosswise direction Q. As a result, the cover band 24f is also simultaneously pressed against the guide rail 12f in a non-positive engagement with the guide rail 12f With the help of straining screw 82f, the non-positive engagement between the clamp strap 80f and the cover band 24f, on the one hand, and the cover band 24f and the guide rail 12f, on the other hand, can be made or intensified or even weakened or cancelled. For this purpose, the straining screw 82f penetrates two sections 92f and 94f of the clamp strap 80f extending essentially parallel to one another, and is screwed with its screw thread 96f into an internal screw thread of the passage 98f of the clamp strap section 94f, while it passes with some play through a passage 100f in the clamp strap section 92f. The diameter of the passage 100f is smaller than the diameter of the head 102f of the straining screw 82f. Upon tightening of the straining screw 82f, the distance or spacing between the two clamp strap sections 92f and 94f is reduced, thereby intensifying the clamping effect of the clamp strap 80f on the cover band 24f and the guide rail 12f. Correspondingly, this clamping engagement can be loosened again by loosening the straining screw 82f.

To facilitate this function, the clamp strap 80f is preferably made of an elastic material, for example metal or synthetic material. To increase the clamping effect, a screw similar to the straining screw 82f can also be provided in the vicinity of the free end 86f of the clamp strap 80f.

Figure 10:
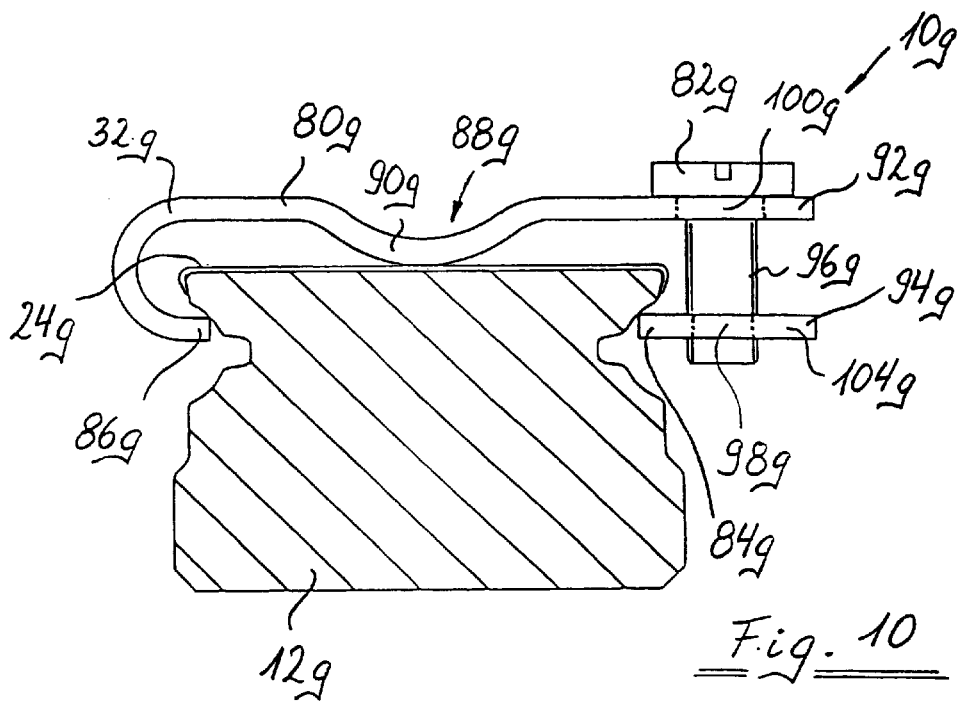

In FIG. 10, a further embodiment of a linear guide arrangement according to the invention is shown, whose design and function essentially corresponds to the embodiment according to FIG. 9. For this reason, in FIG. 10, similar parts are provided with the same reference numbers as in FIG. 9, but with the suffix "g" instead of "f." The embodiment according to FIG. 10 will be described only insofar as it differs from the embodiment according to FIG. 9, to whose description reference is otherwise herewith expressly made.

The only difference between the linear guide arrangement 10g according to FIG. 10 and the linear guide arrangement 10f according to FIG. 9 is that, in FIG. 10, the clamp strap element forming the band securing element 32g comprises a first clamp strap part 80g, in whose free end section 92g the passage opening 100g for the straining screw 82g is formed, as well as a second clamp strap part 104g, which forms the section 94g with the taphole 98g, into which the threaded shaft 96g of the straining screw 82g is screwed. With respect to the clamping effect of the middle section 88g or of the bulge 90g against the cover band 24g and the guide rail 12g, the embodiment according to FIG. 10 corresponds to that of FIG. 9.

Figure 11:
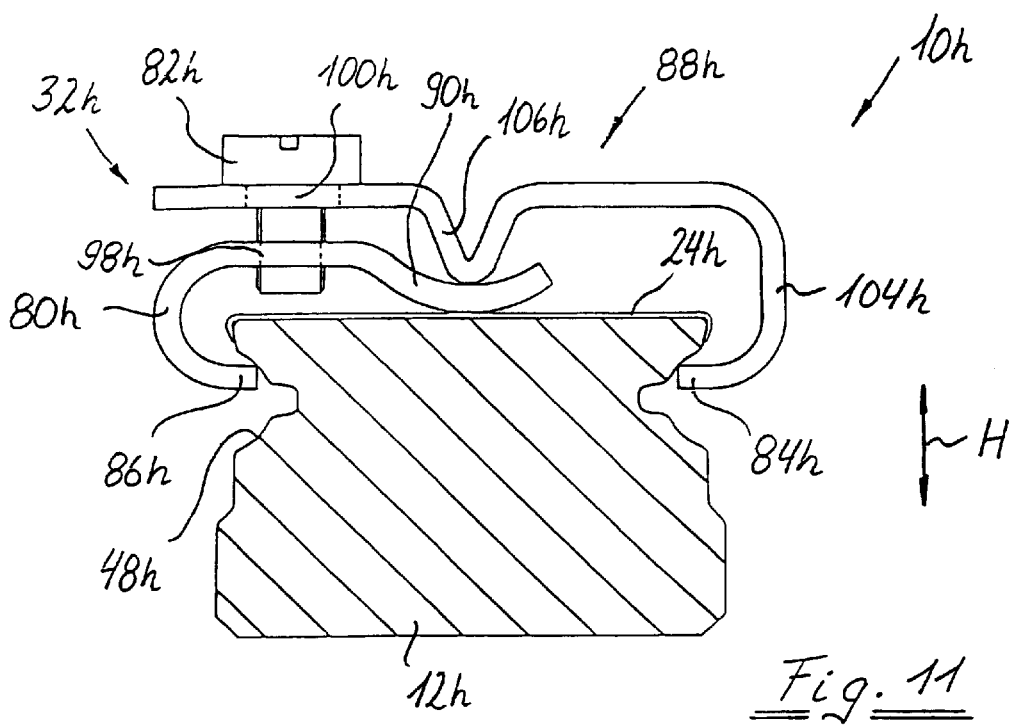

In FIG. 11, another embodiment of a linear guide arrangement according to the invention is shown, whose design and function essentially corresponds to the form of embodiment according to FIG. 9. In FIG. 11, similar parts are therefore provided with the same reference numbers as in FIG. 9, but with the suffix "h" instead of "f." The embodiment according to FIG. 11 will be described only insofar as it differs from the embodiment according to FIGS. 9 and 10, to whose description reference is otherwise herewith expressly made.

In the linear guide arrangement 10h according to FIG. 11, the clamp strap element forming the band securing element 32h comprises a first clamp strap part 80h and a second clamp strap part 104h, which engage with their respective free ends 84h and 86h in longitudinal grooves 48h at the sides of the guide rail 12h. The second clamp strap part 104h is formed with a V-shaped bulge 106h in the middle section 88h of the clamp strap unit 32h, which V-shaped bulge engages the bead 90h of the fist clamp strap part 80h, by which it presses the cover band 24h against the rail track 12h.

In contrast to the embodiment according to FIG. 10, in the linear guide arrangement 10h of FIG. 11, the screw passage 98h for the straining screw 82h is in the first clamp part 80h, while the passage opening 100h is formed at the second clamp part 104h. Nevertheless, by tightening the straining screw 82h the distance of the two clamp parts 80h and 104h in the direction H can be reduced, which intensifies the clamping effect of the clamp strap element 32h on the cover band 24h and the guide rail 12h.

Figure 12:
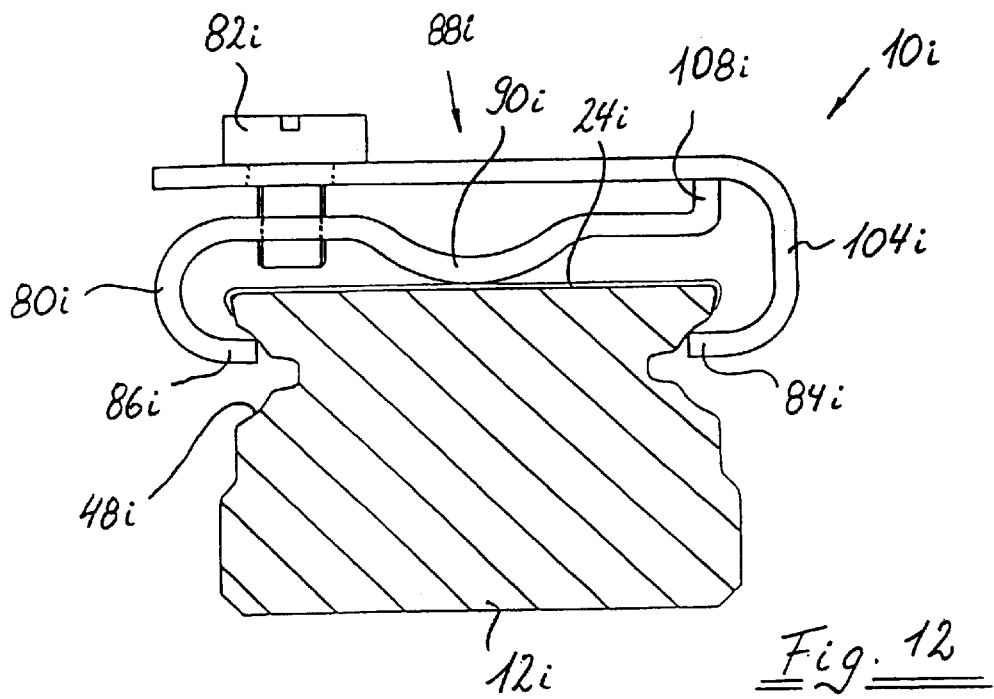

The linear guide arrangement 10i according to FIG. 12 differs from the linear guide arrangement 10h according to FIG. 11 only in that the second clamp strap part 104*i* does not have a bulge corresponding to the V-shaped bulge 106*h*, but is supported on the free end 108*i* of the first clamp strap part 80*i*. With respect to the engagement of the free ends 84*i* and 86*i* of the clamp strap parts 80*i* and 104*i* in the longitudinal grooves 48*i* of the guide rail 12*i*, and the clamping effect of the bulge 90*i*—provided in the middle section 88*i*—of the clamp part 80*i*, on the cover band 24*i* and the guide rail 12*i*, with the help of the straining screw 82*i*, reference is made to the explanations on the above embodiments.

Figure 13:
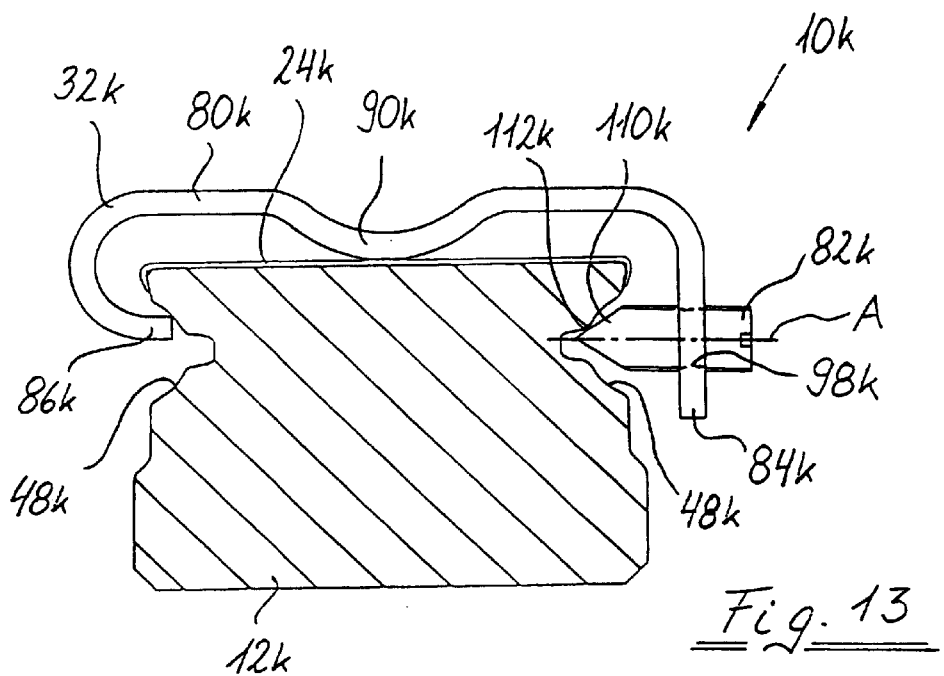

FIG. 13 depicts another embodiment of a linear guide arrangement according to the invention, whose design and function essentially corresponds to the embodiment according to FIG. 9. In FIG. 13, similar pairs are provided with the same reference numbers as in FIG. 9, but with the suffix "k" instead of "f." The embodiment according to FIG. 13 will be described only insofar as it differs from the embodiment according to FIGS. 9 to 12, to whose description reference is otherwise herewith expressly made.

In the linear guide arrangement 10*k* according to FIG. 13, the clamp strap element 32*k* comprises a single clamp strap 80*k*, the free end 86*k* of which engages in a longitudinal groove 48*k* of the guide rail 12*k*. In the vicinity of the other free end 84*k*, the straining screw 82*k* is screwed into a taphole 98*k* in the clamp strap 80*k*. The shaft of the straining screw 82*k* is designed with a preferably conically tapering tip 110*k*. The tip 110*k* engages in the other longitudinal groove 48*k* of the guide rail 12*k*, abutting its conical tip 110*k* against an edge 112*k* of the longitudinal groove.

If the straining screw 82*k* is screwed further into the longitudinal groove 48*k*, the screw axis A of the straining screw 82*k* in the illustration according to FIG. 13 moves downwards and pulls with it the free end 84*k* of the clamp strap 80*k*. As a result of this movement, the clamping effect of the bulge 90*k* of the clamp strap 80*k* on the cover band 24*k* and the guide rail 12*k* is intensified.

Figure 14:
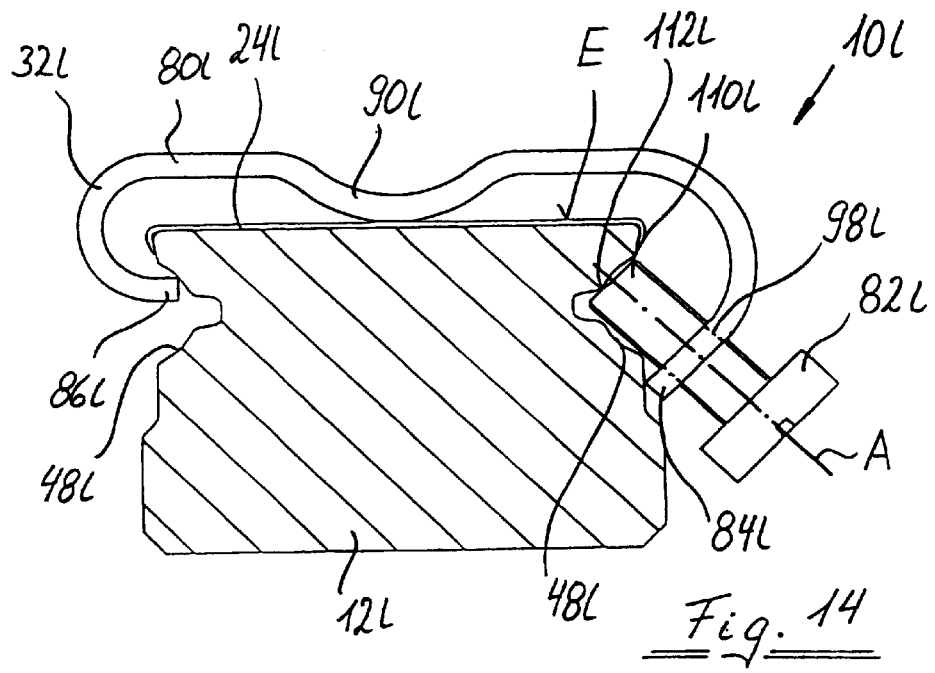

The linear guide arrangement 101 according to FIG. 14 differs from the linear guide arrangement 10*k* according to FIG. 13 only in that it dispenses with a specially designed straining screw with a conical tip and accomplishes the same effect with a conventional straining screw 82*l*, the screw axis A of which cuts the plane E of the cover and 24*l* at an oblique angle. The straining screw 82*l* is screwed into a taphole 98*l*, formed in the vicinity of the free end 84*l* of the clamp strap 80*l* of the band securing element 32*l*, and is engaged with its conventionally designed tip 110*l* an edge 112*l* in a longitudinal groove 48*l* of the guide rail 12*l*. The other free end 86*l* of the clamp strap 80*l*, which engages in the other longitudinal groove 48*l* of the guide rail 12*l*, serves as abutment for the clamping engagement of the bulge 90*l* with the cover band 24*l* and the guide rail 12*l*.

Figure 15:
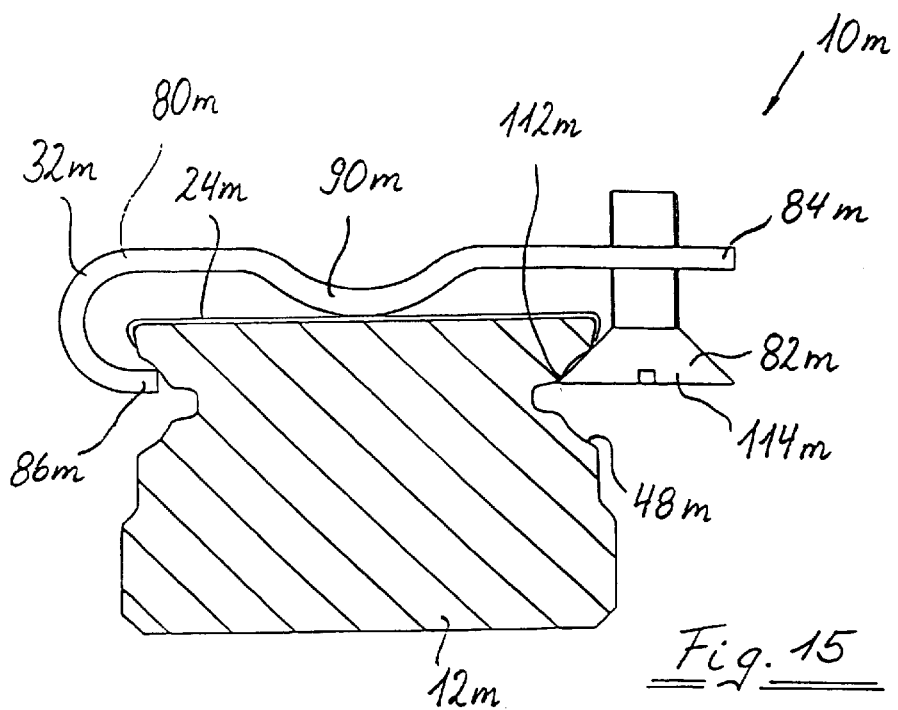

In the linear guide arrangement 10*m* according to FIG. 15, the same function is accomplished by means of a straining screw 82*m* designed as a countersunk head screw, whose countersunk head 114*m* engages with its tapering, preferably conically tapering outer peripheral area, an edge 112*m* of the longitudinal groove 48*m* of the guide rail 12*m*. With respect to the other structural features of the band securing element 32*m*, particularly as far as the free ends 84*m* and 86*m* and the clamping effect of the bulge 90*m* on the cover band 24*m* and the guide rail 12*m* are concerned, reference is made to the above embodiments, particularly the embodiments according to FIGS. 13 and 14.

In FIG. 16, a further embodiment of a linear guide arrangement according to the invention is shown, whose design and function essentially corresponds to the embodiment according to FIG. 9. In FIG. 16, similar parts are therefore provided with the same reference numbers as in FIG. 9, but with the suffix "n" instead of "f." Furthermore, the embodiment according to FIG. 16 will be described only insofar as it differs from the embodiments according to FIGS. 9 to 15, to whose description reference is otherwise herewith expressly made.

In the linear guide arrangement 10*n*, the clamp strap 80*n* of the band securing element 32*n* is not provided with a bulge 90 to achieve the clamping effect on the cover band 24*n* and the guide rail 12*n*. Rather, the axis 122*n* of a cam 124*n* is rotatably positioned in two end plates 120*n* of the clamp strap 80*n* running essentially orthogonal to lengthwise direction L, with the cam pressing the cover band 24*n* against the rail guide 12*n* with its outer peripheral area. As in the other previously described embodiments, the longitudinal ends 84*n* and 86*n* engage in the longitudinal grooves 48*n* of the guide rail 12*n* to serve as clamping abutments.

In the linear guide arrangement 10*o* according to FIG. 17, a spline 126*o* is provided instead of a cam. The spline is placed between the cover band 24*o* and the clamp strap 80*o* of the band securing element 32*o* and is displaceable by means of a screw 128*o* in the crosswise direction Q. Since the section 130*o* adjacent to the free end 84*o* of the clamp strap 80*o*, as observed from the direction H, exhibits less height than the corresponding section 132*o* of the clamp strap 80*o* adjacent to the free end 86*o*, the clamping effect of the spline 126*o* on the cover band 24*o* and the guide rail 12*o* intensifies all the more the further the spline 126*o* is moved to the right by the screw 128*o* in the illustration according to FIG. 17. The free ends 84*o* and 86*o* of the clamp strap 80*o* engage in the longitudinal grooves 48*o* of the guide rail 12*o* as abutments.

Figure 18:
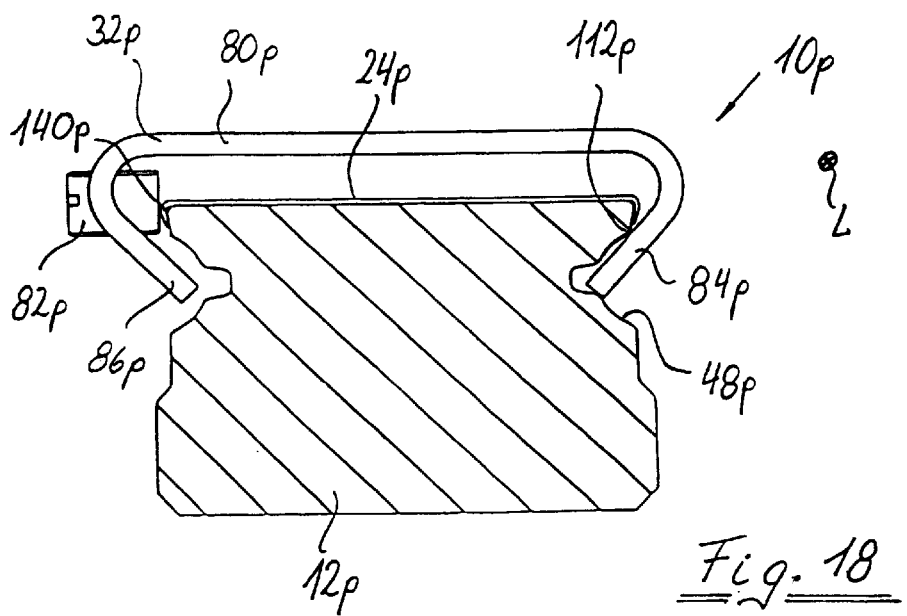

In the linear guide arrangement 10*p* according to FIG. 18, the free end 84*p* of the clamp strap 80*p* of the band securing element 32*p*, under the influence of a straining screw 82*p* placed in the vicinity of the other free end 86*p*, is pulled into engagement with an edge 112*p* of a longitudinal groove 48*p* of the guide rail 12*p*. The straining screw 82*p* abuts against the side on the folded over edge section 140*p* of the cover band 24*p* and presses the edge section 140*p* against the guide rail 12*p*. This pressing at the side can, in a non-positive manner, also prevent a movement of the cover band 24*p* relative to the guide rail 12*p* in lengthwise direction L. The embodiment according to FIG. 18 illustrates that a bulge corresponding to the bulge 90 can also basically be dispensed with.

Figure 19:
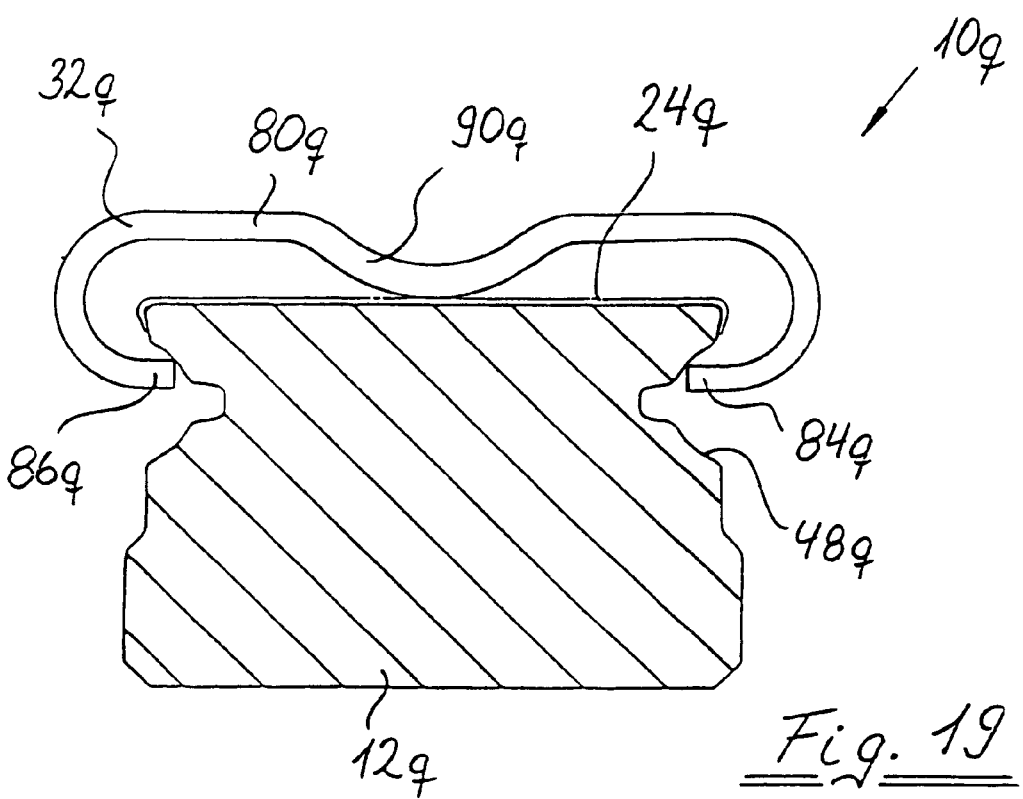

As shown in the embodiment of FIG. 19, a straining screw 82 can be dispensed with if the inherent elasticity of the clamp strap 80*q* of the band securing element 32*q* is utilized in order to press the bulge 90*q* as abutment against the cover band 24*q* and the guide rail 12*q*, while using the engagement of the free ends 84*q* and 86*q* of the clamp strap 90*q* in the longitudinal grooves 48*q* of the guide rail 12*q* as clamping abutments.

In a clamp strap element made up of a single piece or multiple pieces, the clamp strap can comprise a spring element, which is separate from this but preferably connected thereto, which presses the cover band against the guide rail. The spring element can be designed as a stirrup spring, which is connected to the clamp strap in its middle section, and with its two free ends, presses the cover band against the guide rail.

It should be added that the clamping device according to a further variation of the invention can comprise a device for changing the crosswise distance between two clamp strap parts, each of which exhibits one of the free ends of the clamp strap element. "Crosswise distance" is understood here as the distance of the two-clamp strap parts in a direction stretching essentially parallel to the cover band plane and orthogonal to the lengthwise direction of the guide rail. The adjusting direction of the clamping device need not exclusively run in the crosswise direction. Rather, it will suffice if this adjusting direction exhibits a movement component in the crosswise direction.

In a further development of this variation of the invention, the two clamp strap parts can be designed in an essentially identical manner, which has several advantages. On the one hand, this reduces the production costs since only one type of clamp strap part needs to be produced and with a correspondingly greater number of pieces. For another, the two clamp strap parts subtend in the vicinity of the middle section of the cover band above the guide rail. As a result, the clamping device, preferably comprising a straining screw, can also be received in the space above the guide rail and need not project on the side over the guide rail.

Each of the clamp strap parts exhibits one of the free ends of the clamp strap element, and, with this free end, engages at the side of the guide rail. At least one of the two clamp strap parts may each exhibit a bulge and/or bead in the vicinity of the middle section of the cover band, with the bulge and/or bead adjacent to the cover band. With its remaining body, the clamp strap part extends at a small distance from the cover band. If the clamping device is tightened, that is, if the two clamping jaws of the clamp strap parts opposite each other in the middle section of the cover band are moved towards each other, due to the resulting lever action the clamp strap part with the bulge or bead is pressed more firmly against the cover band. In this connection, it could also be advantageous if the design of the free end of at least one of the clamp strap parts which engages with the guide rail is designed to conform to the surface profile of the guide rail. This conformity of the configuration of the free ends of the clamp strap element may also be combined with all other types of embodiments of the invention.

The embodiments of the invention according to the above-discussed supplements will be explained in greater detail in the following, with reference to FIGS. 20–22.

Figure 20:
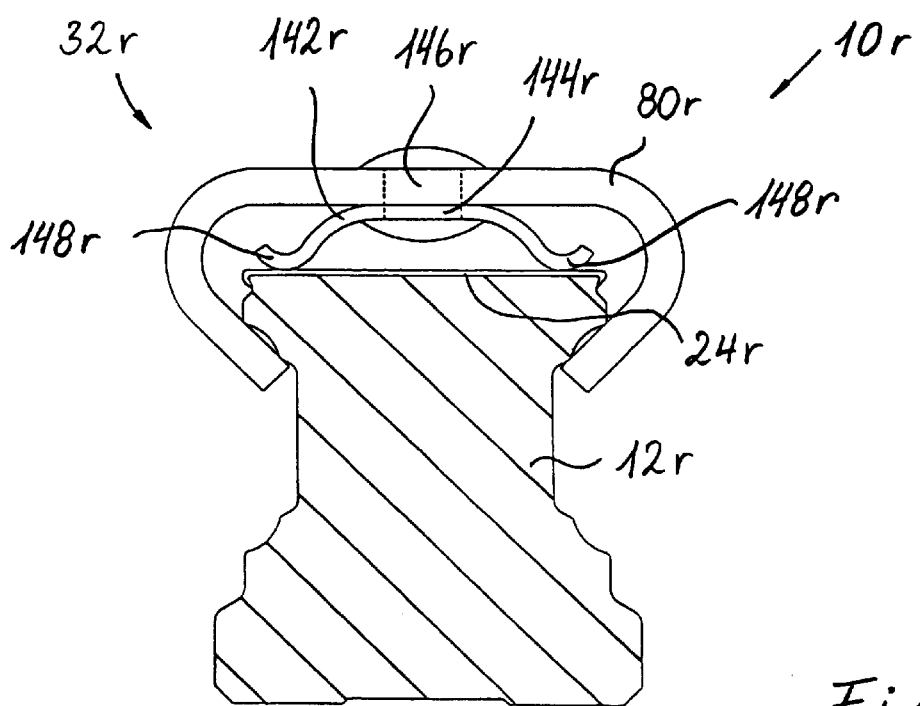
FIGS. 20–22 illustrate embodiments of linear guide arrangements with a clamp strap-track securing element.

In the linear guide arrangement 10r according to FIG. 20, the band securing element 32r is made of a clamp strap unit which comprises a clamp strap 80r and a stirrup spring 142r. The stirrup spring 142r is fastened to the clamp strap 80r in its middle section 144r by means of a rivet 146r. With its two free ends 148r, the spring 142r presses the cover band 24r against the guide rail 12r. With respect to other details, reference can be made to the description of the embodiments according to FIGS. 9–19.

Figure 21:
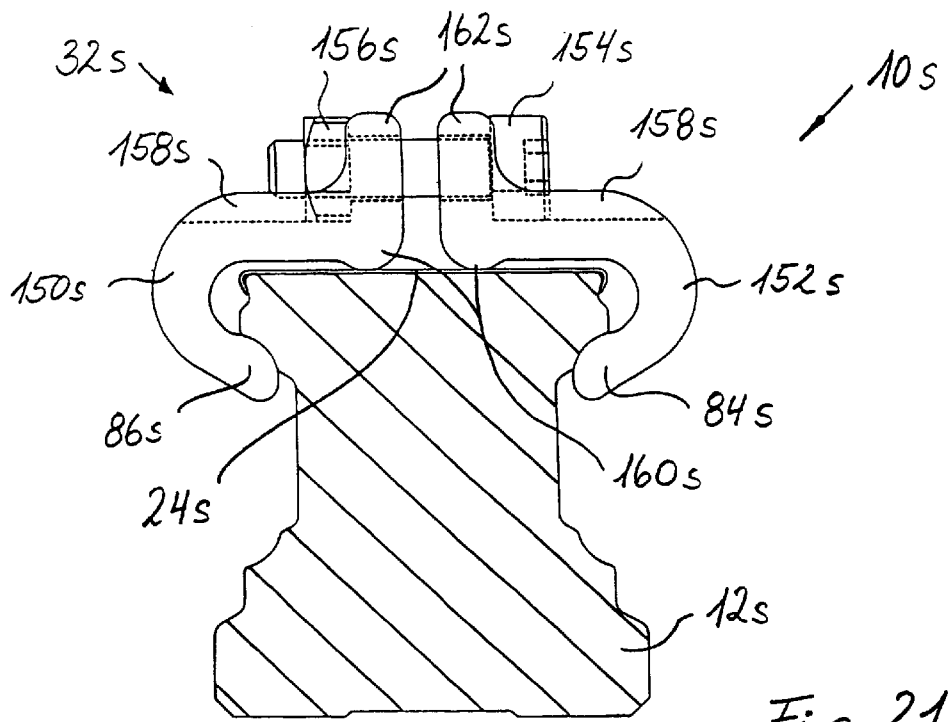

In the linear guide arrangement 10s shown in FIG. 21, the band securing element 32s is made of a clamp strap element which comprises the two clamp strap parts 150s and 152s, which are designed essentially identical. In the vicinity of the middle section of the cover band 24s, the two clamp strap parts 150s, 152s face each other at a short distance and are connected to one another by means of a straining screw 154s and a dedicated screw nut 156s. For this, the straining screw 154s passes through two clearance holes in the clamp strap parts 150s and 152s.

A twisting of the nut 156s while drawing up the screw 154s can be prevented by a corresponding prismatic design of a trough-line guide 158s. The clamp strap part 152s is also preferably made with a prismatic guide 158s. A turning of the screw 154s in this prismatic guide 158s can be facilitated by a round head of the screw 154s with an appropriately small diameter.

Each of the two clamp strap parts 150s, 152s has in the vicinity of the clamping section 162s a bulge 160s, with which it presses the cover band 24s against the guide rail 12s when the straining screw 154s is tightened on account of the lever action of the clamp strap parts 150s, 152s.

Furthermore, it should be noted that the free ends 84s and 86s of the clamp strap parts 150s, 152s are preferably made to conform to the surface profile of the guide rail 12s. This variation of the embodiment can be used for all the above-described clamp strap variations of the embodiment of the band securing element according to FIGS. 9–19.

Figure 22:
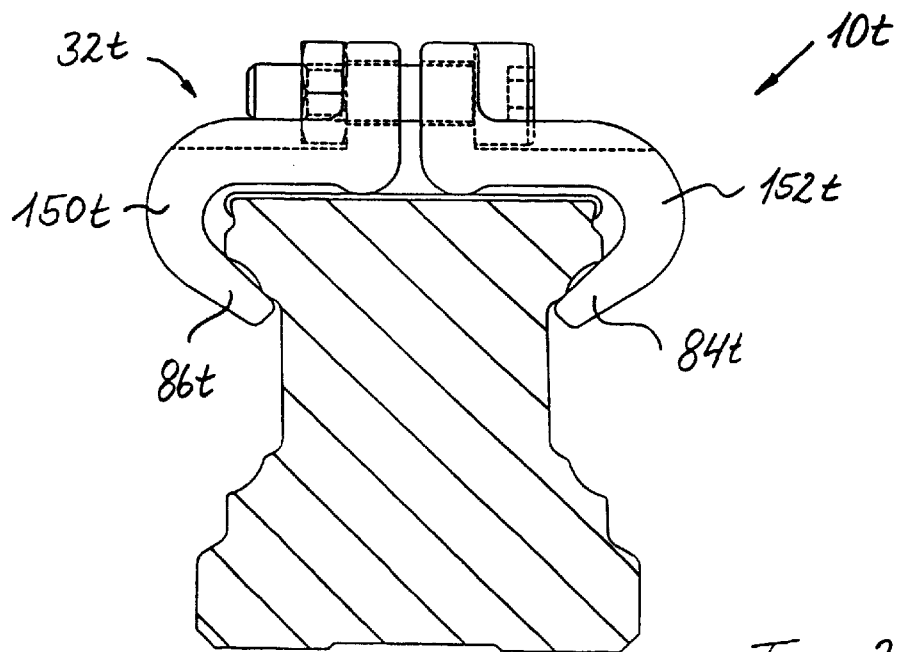

In the linear guide arrangement 10t according to FIG. 22, in comparison with the linear guide arrangement 10s according to FIG. 21, this design variation of the free ends 84t and 86t of the clamp strap parts 150t, 152t of the band securing element 32t has been dispensed with. Otherwise, the form of embodiment according to FIG. 22 corresponds in design and function to that of FIG. 21, to whose description reference is otherwise herewith expressly made.

What is claimed is:

1. A linear guide arrangement, comprising:
   an elongated guide rail,
   a guide carriage mounted on the guide rail for travel thereon in the lengthwise direction (L) of the guide rail;
   a cover band covering a surface of the guide rail facing the guide carriage; and
   a band securing element is located in the vicinity of at least one of the two longitudinal ends of the guide rail, said the band securing element being non-positively engaged with the cover band as well as with the guide rail.

2. The linear guide arrangement according to claim 1, wherein the band securing element comprises a clamp strap element.

3. The linear guide arrangement according to claim 2, wherein the clamp strap element has two free ends that engage the sides of the guide rail.

4. The linear guide arrangement according to claim 3, wherein the two free ends of the clamp strap element engage in longitudinal grooves on the sides of the guide rail.

5. The linear guide arrangement according to claim 2, wherein the clamp strap element presses the cover band against the guide rail at a section of the clamp strap element located between its two free ends.

6. The linear guide arrangement according to claim 2, wherein the clamp strap element has a clamp strap made of one or several pieces.

7. The linear guide arrangement according to claim 6, wherein said clamp strap is made of an elastic material.

8. The linear guide arrangement according to claim 6, wherein the clamp strap, or at least one clamp strap part, is formed with a bulge in the vicinity of the middle section of the clamp strap element.

9. The linear guide arrangement according to claim 8, wherein said bulge is in the form of a bead.

10. The linear guide arrangement according to claim 6, wherein the clamp strap comprises a separate spring element connected to the clamp strap, said spring element pressing the cover band against the guide rail.

11. The linear guide arrangement according to claim 10, wherein the spring element comprises a bowed fastening spring which is connected at its middle section to the clamp strap and presses the cover band against the guide rail with its two free ends.

12. The linear guide arrangement according to claim 2, wherein the clamp strap element comprises a clamping device through which the pressing force of the clamp strap element against the cover band can be adjusted.

13. The linear guide arrangement according to claim 12, wherein the clamping device comprises a device for changing the distance between a first section of the clamp strap and a second section of the clamp strap, said second section being adjacent to a free end of the clamp strap running essentially parallel to said first section.

14. The linear guide arrangement according to claim 12, wherein the clamping device comprises a device for changing the distance between a first clamp strap part and a second clamp strap part, said second clamp strap part being adjacent to a free end of the clamp strap and running essentially parallel to said first clamp strap part.

15. The linear guide arrangement according to claim 14, wherein the middle section of the clamp strap element is provided on the first clamp strap part.

16. The linear guide arrangement according to claim 14, wherein the second clamp strap part bears on a side of the first clamp strap part facing away from the cover band.

17. The linear guide arrangement according to claim 16, wherein the second clamp strap part bears on the first clamp strap part in the middle section of the clamp strap element.

18. The linear guide arrangement according to claim 16, wherein the second clamp strap part bears on a section of the first clamp strap part which connects to the middle section on the side opposite the free end of the first clamp strap part.

19. The linear guide arrangement according to claim 12, wherein the clamping device comprises a clamping element which forms one of the free ends of the clamp strap element.

20. The linear guide arrangement according to claim 19, wherein the clamping element comprises a straining screw which is screwed to the clamp strap or at least to a clamp strap part.

21. The linear guide arrangement according to claim 20, wherein the straining screw has a tapered head and a screw axis (A) running orthogonal to the plane (E) of the cover band, said tapered screw head engaging in a longitudinal groove at the side of the guide rail.

22. The linear guide arrangement according to claim 20, wherein the straining screw has a conically, tapering tip and a screw axis (A) running essentially in the crosswise direction (Q) of the cover band (24k), said tapered tip surface of the screw engaging an edge of a longitudinal groove at the side of the guide rail.

23. The linear guide arrangement according to claim 20, wherein the screw thread engages the guide rail on the side, and wherein the screw axis (A) runs at least partially in a direction essentially orthogonal to the plane (E) of the cover band plane.

24. The linear guide arrangement according to claim 12, wherein the clamping device includes a cam which is rotatably arranged around an axis in the middle section of the clamp strap element and is pressed with its peripheral surface against the cover band.

25. The linear guide arrangement according to claim 12, wherein:
the clamp strap in the vicinity of a side edge of the cover band is spaced a greater orthogonal distance from the cover band than in the vicinity of the other side edge of the cover band; and
the clamping device comprises a spline displaceable in the crosswise direction (Q) of the cover band.

26. The linear guide arrangement according to claim 12, wherein the clamping device presses at the side against one of the side edges of the cover band.

27. The linear guide arrangement according to claim 12, wherein the clamping device comprises a device for changing the crosswise distance between two clamp strap parts, each of which contains one of the free ends of the clamp strap element.

28. The linear guide arrangement according to claim 27, wherein at least one of the two clamp strap parts has a bulge and/or a bead in the vicinity of the middle section of the cover band, with said bulge or bead being adjacent to the cover band.

29. The linear guide arrangement according to claim 27, wherein the free end of at least one of the clamp strap parts engaged with the guide rail is configured to conform to the surface profile of the guide rail.

30. A linear guide arrangement, comprising:
an elongated guide rail;
a guide carriage mounted on the guide rail for travel thereon in the lengthwise direction (L) of the guide rail;
a cover band covering a surface of the guide rail facing the guide carriage;
a band securing element located in the vicinity of each of the two longitudinal ends of the guide rail, the two band securing elements jointly securing the cover band to the guide rail at least with respect to the displacement thereof in the lengthwise direction (L) of the guide rail; and
each of the band securing elements impedes movement of the cover band relative to the guide rail at least in the direction towards the other band securing element.

31. The linear guide arrangement according to claim 30, wherein at least one band securing element is positively engaged with the cover band by the engagement of a projection provided on one of the band securing element and the cover band with a cooperating recess provided on the other of the cover band and the band securing element.

32. The linear guide arrangement according to claim 31, wherein said recess is provided in approximately the transverse center of the cover band.

33. The linear guide arrangement according to claim 31, wherein:
the cover band is provided with said recess to one side of the transverse center thereof; and
said projection is provided on the band securing element and engages said recess essentially in the crosswise direction (Q) of the cover band.

34. The linear guide arrangement according to claim 31, wherein:
the cover band is provided with said recess; and
said projection is provided on the band securing element and engages said recess in a direction running essentially orthogonal to a plane (E) containing said surface of the cover band.

35. The linear guide arrangement according to claim 34, wherein the projection is connected with the band securing element through a flexible web.

36. The linear guide arrangement according to claim 34, wherein the projection is integrally formed with the band securing element in one piece.

37. The linear guide arrangement according to claim 34, wherein the projection is an element separately made from a base part of the band securing element.

38. The linear guide arrangement according to claim 30, wherein the band securing element is non-positively secured to the guide rail.

39. The linear guide arrangement according to claim 38, wherein the band securing element includes at least one clamp projection which engages at the side on the guide rail.

40. The linear guide arrangement according to claim 30, wherein the band securing element is positively secured to the guide rail at least with respect to movement in the direction of the other band securing element.

41. The linear guide arrangement according to claim 40, wherein the band securing element includes a flange extending essentially orthogonal to the lengthwise direction (L) of the guide rail, said flange being adjacent to a frontal area of the guide rail in the assembled state of the linear guide arrangement.

42. The linear guide arrangement according to claim 30, wherein the cover band has a length greater than that of the guide rail and the cover band is positively connected with the band securing element in a section protruding over the adjacent longitudinal end of the guide rail.

43. The linear guide arrangement according to claim 42, wherein the band securing element includes a cavity into which the section of the cover band projecting over the end of the guide rail is introduced in the assembled state of the linear guide arrangement.

44. The linear guide arrangement according to claim 43, wherein the band securing element is made of at least two parts, wherein one part has an upper terminating face of the cavity and the other part has a lower terminating face of the cavity.

45. The linear guide arrangement according to claim 44, wherein the two terminating faces of the cavity at the side being made on one and the same part.

46. The linear guide arrangement according to claim 44, wherein said at least two parts are snapable to one another.

47. The linear guide arrangement according to claim 30, wherein the band securing element is made at least partially as a synthetic or metal injection molded part.

48. The linear guide arrangement according to claim 30, wherein the cover band is snapped onto the guide rail with its side edges.

* * * * *